(12) United States Patent
Johnson et al.

(10) Patent No.: US 8,869,488 B2
(45) Date of Patent: Oct. 28, 2014

(54) CONCRETE LANDSCAPING EDGERS AND METHODS

(71) Applicant: Anchor Wall Systems, Inc., Minnetonka, MN (US)

(72) Inventors: Jay J. Johnson, Star Prairie, WI (US); Robert Brian Burnquist, Chaska, MN (US); Steven Paul Bennett, Coon Rapids, MN (US)

(73) Assignee: Anchor Wall Systems, Inc., Minnetonka, MN (US)

(*) Notice: Subject to any disclaimer, the term of this patent is extended or adjusted under 35 U.S.C. 154(b) by 0 days.

(21) Appl. No.: 13/761,702

(22) Filed: Feb. 7, 2013

(65) Prior Publication Data

US 2014/0215932 A1 Aug. 7, 2014

(51) Int. Cl.
*E04B 5/04* (2006.01)
*A01G 1/08* (2006.01)

(52) U.S. Cl.
CPC .......................................... *A01G 1/08* (2013.01)
USPC .............................................. 52/608; 52/604

(58) Field of Classification Search
USPC ............ 52/102, 608, 609, 604, 605, 606, 607
See application file for complete search history.

(56) References Cited

U.S. PATENT DOCUMENTS

| | | | |
|---|---|---|---|
| 1,855,987 A * | 4/1932 | Rammer | 52/608 |
| D378,702 S | 4/1997 | Blomquist et al. | |
| 5,930,947 A | 8/1999 | Eckhoff | |
| 6,591,547 B1 * | 7/2003 | Staten et al. | 47/33 |
| D506,013 S | 6/2005 | Anderson et al. | |
| D511,845 S | 11/2005 | Anderson | |
| D515,710 S | 2/2006 | Anderson et al. | |
| D515,711 S | 2/2006 | Anderson | |
| D521,654 S | 5/2006 | Anderson et al. | |
| 7,536,825 B2 | 5/2009 | Perotti | |
| D613,430 S | 4/2010 | Perotti | |
| D624,213 S | 9/2010 | Perotti | |
| D657,890 S | 4/2012 | Riccobene | |
| 2002/0023403 A1 * | 2/2002 | Whitson | 52/578 |
| 2002/0069595 A1 * | 6/2002 | Knudson et al. | 52/102 |
| 2004/0118071 A1 * | 6/2004 | Price et al. | 52/606 |
| 2004/0163353 A1 * | 8/2004 | Dean et al. | 52/608 |
| 2005/0123362 A1 * | 6/2005 | Price et al. | 405/284 |
| 2005/0252101 A1 * | 11/2005 | Anderson et al. | 52/102 |
| 2006/0179777 A1 * | 8/2006 | Tufts et al. | 52/596 |
| 2007/0289247 A1 * | 12/2007 | Hamel | 52/596 |
| 2009/0293377 A1 * | 12/2009 | Doman | 52/102 |

OTHER PUBLICATIONS

"Belgium Blocks," http://www.livingstonfarmlandscape.com/products/stone/edging-and-border-stone/belgium-blocks . . . , retrieved Mar. 13, 2012.

(Continued)

*Primary Examiner* — Jessica Laux
(74) *Attorney, Agent, or Firm* — Merchant & Gould P.C.

(57) ABSTRACT

A landscaping edger includes a top face, bottom face, front face, rear face, and first and second end faces. The first and second end faces are angled inwardly toward each other from the front face to the rear face. The top face has a three dimensional topographical definition with a plurality of projections and a plurality of reliefs recessed from the projections. The entire top face is sloped so that gravity will drain water off the top face.

12 Claims, 8 Drawing Sheets

(56) References Cited

OTHER PUBLICATIONS

"Borders & Edging, Norristown Brick, Inc.," http://www.norristownbrick.com/borders-edging/, retrieved Mar. 13, 2012.

"Davesgarden.com," http://pics.davesgarden.com/pics/2009/08/25/TexasPuddyPrint/bdadaB.jpg, retrieved Mar. 13, 2012.

"Dekorra Faux Rock Lawn & Garden Stone Border Edging," http://rocksfast.com/faux-stone-border-edgers/dekorra-faux-stone-border-edging.html, retrieved Mar. 13, 2012.

"Edging stone kerb," http://www.archiexpo.com/prod/bradstone/edging-stone-kerbs-11509-347488.html, retrieved on Mar. 13, 2012.

"Garden Edging," http://www.houzz.com/ideabooks/744461/thumbs/garden-edging, retrieved on Mar. 13, 2012.

"Greensborogardens," http://greensborogardens.files.wordpress.com/2008/05/edging3-w.jpg, retrieved Mar. 13, 2012.

"Image of edger," http://images.lowes.com/product/400001/4000001816790.jpg%3Fwid%3D15B%26c, retrieved Mar. 13, 2012.

"Image of edger," http://o.tgn.com/d/landscaping/1/0/M/L/garden_edging_1.jpg, retrieved Mar. 13, 2012.

"Image of edger," http://www.walmart.com/ip/Suncast-Border-Stone-Edging/6435917?findingMethod=rr, retrieved on Mar. 13, 2012.

"Ron Hazelton Home Improvement Online, How to Lay Edging Blocks Along Beds," http://www.ronhazelton.com/tips/how_to_lay_edging_blocks_along_beds, retrieved Mar. 13, 2012.

"Suncast Border Stone Edging," http://www.walmart.com/ip/Suncast-Border-Stone-Edging/6435917, retrieved Mar. 13, 2012.

* cited by examiner

CONCRETE LANDSCAPING EDGERS AND METHODS

TECHNICAL FIELD

This disclosure relates to concrete landscaping edgers.

BACKGROUND

Landscape edging is useful in several ways. Edging can designate where a grass or a flower bed start, and the edging can make the area more attractive. There are many options available for use for edging. Such options include the use of timbers, plastic edging strips, or concrete edging blocks. Concrete edging blocks (referred to herein as "edgers") have advantages over timbers, in that they will not rot over time, and they have advantage over plastic edging strips which can wear out from exposure to weather conditions over time. Edgers are more permanent than timbers and plastic strips, and they come in an assortment of colors and styles.

SUMMARY

A landscaping edger is provided to improve on the prior art landscaping edgers. The improved landscaping edger as described herein includes features that will allow the edger to be arranged with other edgers to form curved or circular arrays or straight line edging. The improved edger as described herein has features that allow for complete drainage of rain water from the top face.

Generally, a landscaping edger as described herein includes a top face, opposite bottom face, front face, and opposite rear face. There are first and second opposite end faces extending between the top and bottom faces and the front and rear faces. The first and second end faces are angled inwardly toward each other from the front face to the rear face. The intersection of the first end face with the front and rear faces are radiussed. The intersection of the second end face with the front and rear faces are radiussed. The top face has a length extending from the first end face to the second end face. The top face has a width extending from the front face to the rear face. The length is at least twice the width. The top face has a three dimensional topographical definition with a plurality of projections and a plurality of reliefs recessed from the projections providing a distinct and attractive ornamental appearance. There are sufficient points on the top face inside of the edges of the top face that are connected to an edge of the top face along paths that decrease in height from the bottom of the block so that water will drain from the entire top face of the block.

Methods of landscaping can include using edgers of the type described above.

A method of using a landscaping edger can include providing an edger, positioning the edger with the top face up and bottom face against a base surface, and allowing water to drop onto the face, the top face being constructed and arranged to drain the water by gravity off of the entire top face.

Techniques for construction of the edgers are also described. The techniques include approaches to forming the edgers in one operation, for a convenient, efficient manufacturing process.

Herein, a variety of specific detailed characterizations are made, for the examples shown. There is no specific requirement that an edger include all of the features characterized to be in accordance with principles discussed herein. However, inclusion of many of the features characterized provides for particularly advantageous edgers.

DETAILED DESCRIPTION

Figure 1:
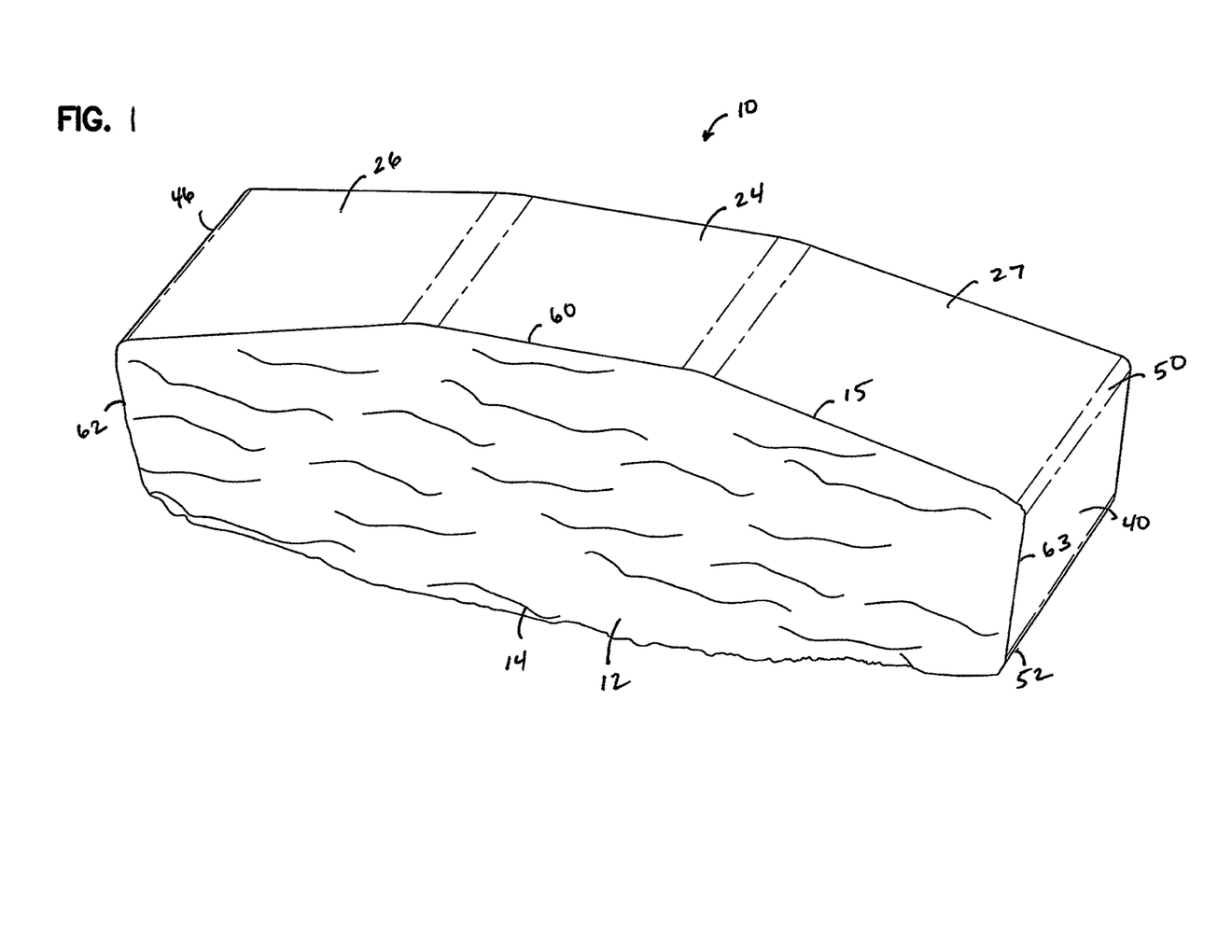
FIG. 1 is a perspective view of one embodiment of a landscaping edger made in accordance with principles of this disclosure.
Figure 2:
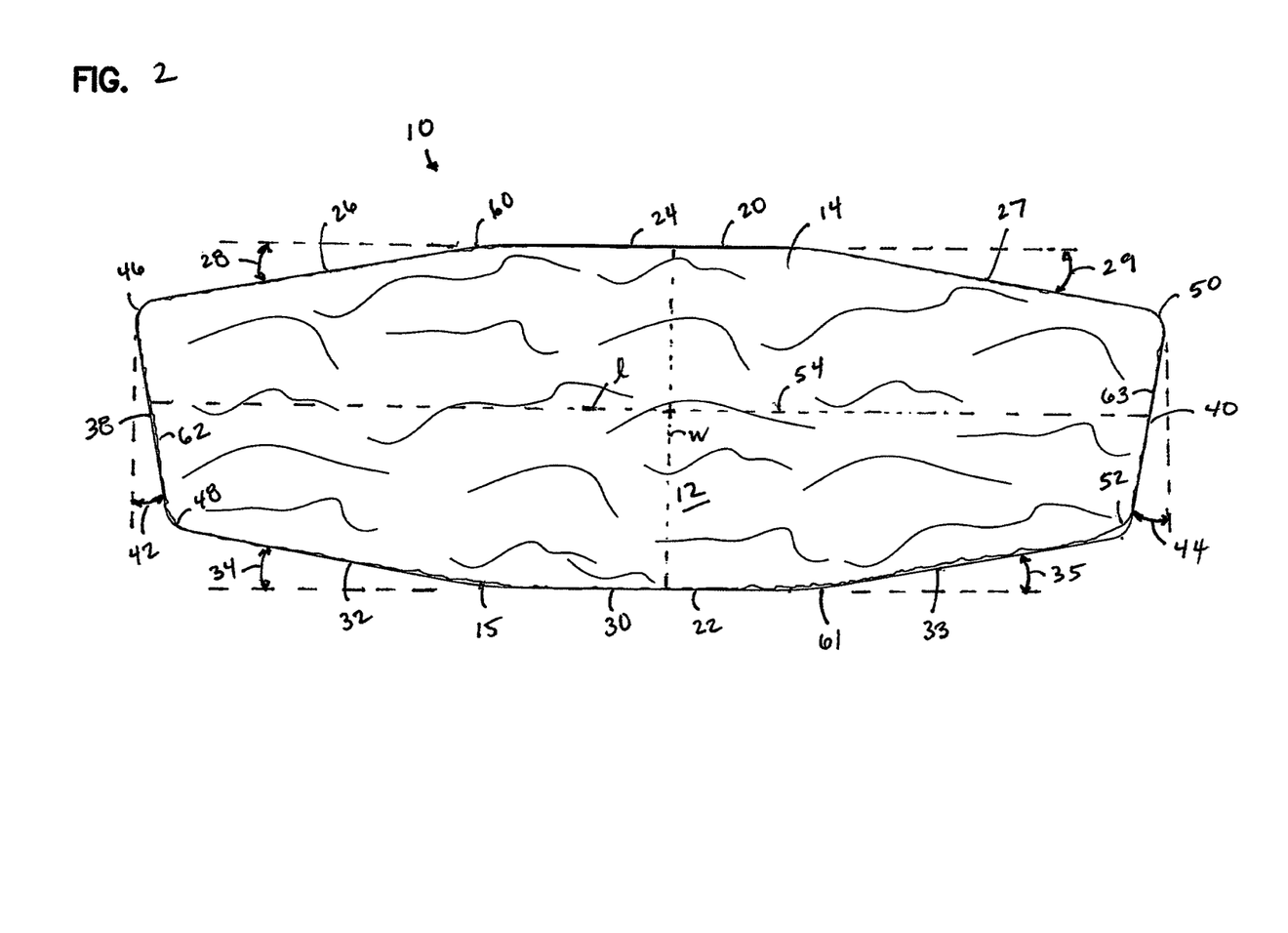
FIG. 2 is a top view of the edger of FIG. 1.
Figure 3:
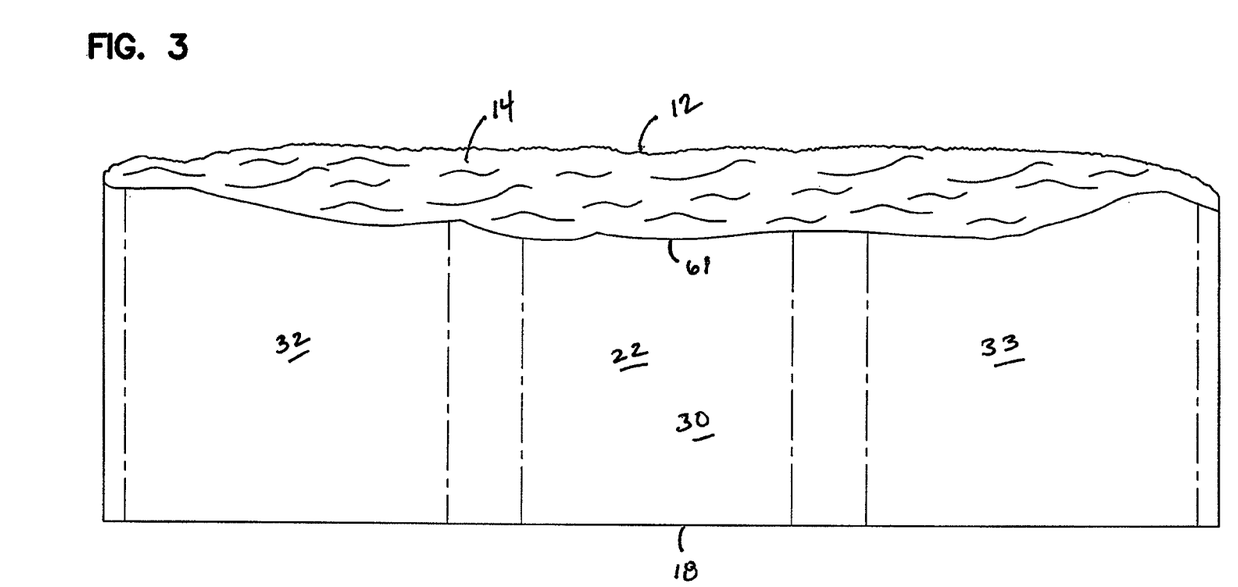
FIG. 3 is a view of the rear face of the edger of FIG. 1.

A first embodiment of a landscaping edger is shown in FIGS. 1-3, generally at 10. The edger 10 includes a top face 12. The top face 12 will be the face that is intended for being oriented in the uppermost position, facing upwardly, when the edger 10 is used as intended in landscaping applications.

The top face 12 includes, in preferred embodiments, a three-dimensional topographical definition 14 with a plurality of projections and a plurality of reliefs recessed from the projections. A greatest height difference between the projections and reliefs is typically at least 0.5 inch and no greater than 1.00 inch, and preferably about 0.75 inch. This topographical definition 14 provides the edger 10 with an ornamental, distinct and attractive appearance. The topographical definition 14 of the first embodiment is shown in FIGS. 1 and 2 schematically. FIGS. 4-9 illustrate a second embodiment of a landscaping edger with a topographical definition 14 in the form of a simulated ledge wall face 80.

The edger 10 further includes a bottom face 18 opposite the top face 12. The bottom face 18 is preferably flat, such that it can provide a good, reliable surface for the edger 10 to be mounted against its base, such as the earth or a sand base, during landscaping. The bottom face 18 preferably is plain, uniformly flat, and unornamented.

A front face 20 and opposite rear face 22 extend between the top face 12 and bottom face 18. The front face 20 and rear face 22 are generally plain and unornamented. In the example embodiment illustrated, the front face 20 and rear face 22 are not flat, but form a generally curved or curvilinear surface.

In the embodiment shown in FIGS. 1-3, the front face 20 has a center portion 24 that is relatively straight and flat. On each side of the center portion 24, the front face 20 has tapered portions 26, 27 that are tapered and angled inwardly in a direction toward the rear face 22. The tapered portion 26 declines at an angle 28 relative to the center portion 24 (see FIG. 2). The angle 28 can range from 5-20 degrees, and in one example is about 10 degrees. The tapered portion 27 decreases at angle 29 relative to the center portion 24. Typically, the front face 20 will be symmetrical, such that the angle 29 is the same as angle 28. The rear face 22 has a center portion 30 that is generally flat and straight. Extending from the center portion 30, on each side of the center portion 30 are tapered portions 32, 33. The tapered portion 32 is angled away from the center portion 30 and in a direction toward the front face 20. The angle 34 in FIG. 2 is the angle of the tapered portion 32 relative to the center portion 30, and it can be from 5-20 degrees. In the example shown, angle 34 is about 10 degrees. Angle 35 is the angle of tapered portion 33 relative to the center portion 30. In preferred embodiments, the rear face 22 will be symmetrical, so that the angle 35 is the same as the angle 34. In preferred embodiments, each of the angles 28, 29, 34, and 35 are the same, providing a symmetrical edger 10. Preferably, the center portions 24, 30 of the front face 20 and rear face 22 have a length about equal to each of the respective tapered portions 26, 27 and 32, 33. In this embodiment, the center portion 24 of the front face 20 is longer than the center portion 30 of the rear face 22. In one example embodiment, the difference in length between the center portion 24 of the front face 20 and the center portion 30 of the rear face 22 is not more than 20%, and often not more than 10%.

The edger 10 further includes a first end face 38 and an opposite second end face 40. The first and second end faces 38, 40 extend between the top and bottom faces 12, 18 and the front and rear faces 20, 22. To allow for the arranging of the edger 10 in curved or circular paths, the first and second end faces 38, 40 are angled inwardly toward each other as they extend from the front face 20 to the rear face 22. In general, the first end face 38 and second end face 40 are flat, without protrusions or protuberances. The first end face 38 is angled inwardly in a direction toward the rear face 22 at an angle 42 (FIG. 2), while second end face 40 is angled inwardly from the front face 20 toward the rear face 22 at an angle 44 (FIG. 2). Angles 42, 44 will typically be about the same and can range from 5-20 degrees. In one example, the angles 42, 44 are about 10 degrees. Different angles 42, 44 would provide for different diameters of circular arrays or curved paths for the edgers 10 to make.

Still in reference to FIG. 2, the first end face 38 intersects the front face 20 at corner 46. The first end face 38 intersects with the rear face 22 at corner 48. Similarly, the second end face 40 intersects the front face 20 at corner 50 and with the rear face 22 at corner 52. Corners 46, 48, 50, 52 are rounded or radiussed in preferred embodiments. These radiussed corners 46, 48, 50, 52 allow for the edgers 10 to be arranged next to each other along their end faces 38, 40 and arranged in curved, circular, or nonlinear paths. Both the angles 42, 44, as well as the radiussed corners 46, 48, 50, 52 allow for a range of curves to be formed by the edgers 10. In the example embodiment illustrated, each of the corners 46, 48, 50, 52 are on the same radius, of about 0.25 inch. Of course, these radii can vary from this number and the radius of each of the corners 46, 48, 50, 52 can vary from each other.

The top face 12 defines a central axis 54, which extends between a center point of first end face 38 and second end face 40. Along axis 54 is defined an average length of the top face 12. The top face 12 also has a longest length, which is defined between corner 46 and corner 50. The top face 12 also has a shortest length between corner 48 and corner 52. In preferred embodiments, the difference between the shortest length of the top face 12 and longest length of the top face 12 is less than 10%. The average length along the axis 54 is about the average between the longest length and the shortest length.

The top face 12 defines a width extending from the center portion 24 of the front face 20 to the center portion 30 of the rear face 22. The width is shown at w in FIG. 2, while the average length is shown at l in FIG. 2. In preferred embodiments, the length l will be at least twice the width w. Typically, a ratio of the length l to the width w of the top face 12 is in the range of 2-3:1.

In preferred embodiments, the periphery 15 of the top face 12 includes a peripheral edge 60, joining the top face 12 to the front face 20; a peripheral edge 61, joining the top face 12 to the rear face 22; a peripheral edge 62, joining the top face 12 to the first end face 38; and a peripheral edge 63, joining the top face 12 to the second end face 40.

In preferred embodiments, the top face 12 has sufficient points on the top face 12 inside of the edges of the top face 12 that are connected to one of the peripheral edges 60, 61, 62, 63 of the top face 12 along paths that decrease in height as measured from the bottom face 18 so that water will drain from the entire top face 12 of the edger 10. That is, in preferred arrangements, the entire top face 12 is sloped so that water will drain by gravity over at least one, two, three, or all of the peripheral edges 60-63 of the top face 12. The edgers 10 will, therefore, not allow water to collect on the top face 12. If water were allowed to collect in the top face 12, it could freeze and lead to premature degradation of the topographical definition 14 of the top face 12.

Figure 6:
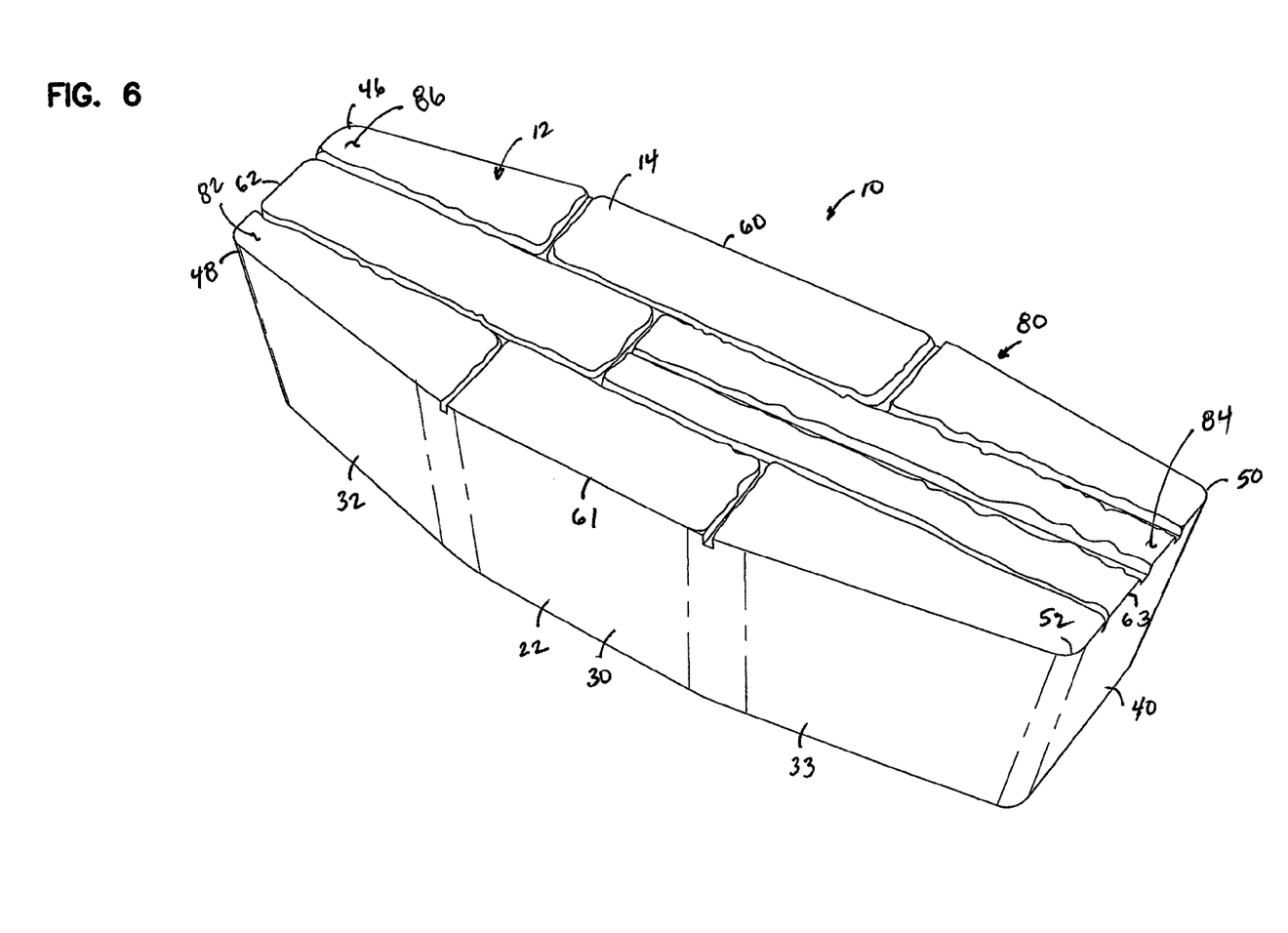
FIG. 6 is a schematic, perspective view of the second embodiment of a landscaping edger made in accordance with principles of this disclosure.
Figure 7:
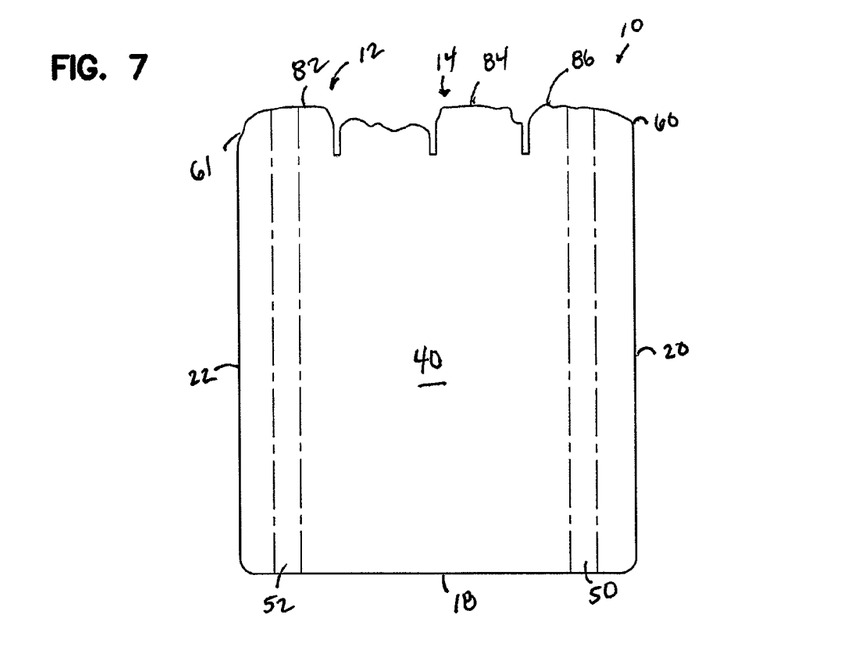
FIG. 7 is a right end view of the edger of FIG. 6.
Figure 8:
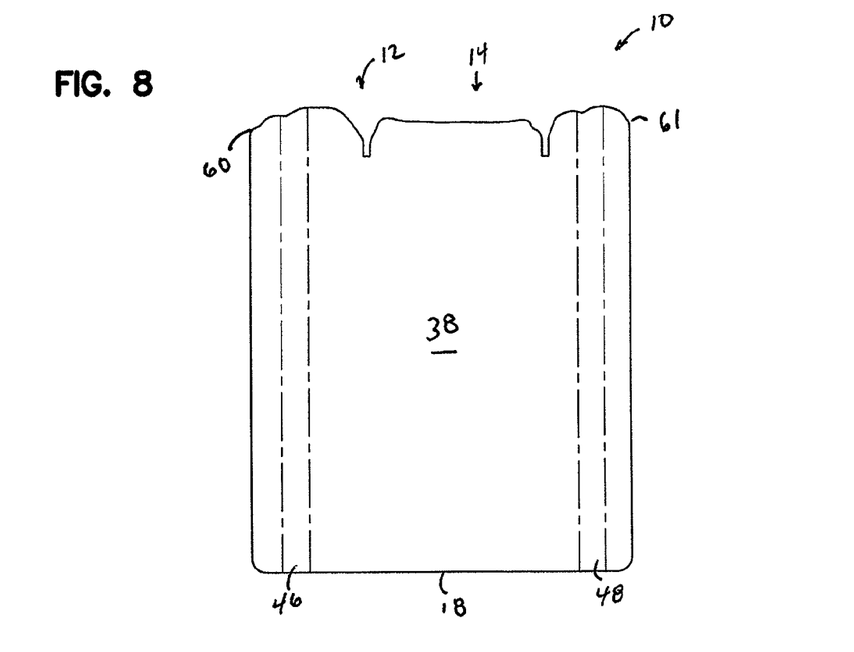
FIG. 8 is a left end view of the edger of FIG. 6.

Reference is now made to the embodiment of FIGS. 6-9. The same reference numerals are used for analogous parts in this embodiment. The difference between the embodiment of FIG. 1 and the embodiment of FIG. 6 is the topographical definition 14 of the top face 12. As can be seen in FIG. 6, the topographical definition 14 has the appearance of a ledge wall face 80. Of course, many other topographical definitions 14 can be molded into the top face 12. In one example, the edger 10 can be molded according to the process described in U.S. Pat. No. 7,208,112, incorporated herein by reference. In this method, the edger 10 can be molded with the top face 12 oriented upwardly in the mold. The stripper shoe includes a molded three-dimensional pattern or texture, with a maximum relief of at least 0.5 inch and no greater than 1.0 inch, preferably about 0.75 inch. Engagement between the stripper shoe and the top face 12 results in molding a three-dimensional pattern or texture in the top face 12 having a maximum relief of at least 0.5 inch and no greater than 1.0 inch, preferably about 0.75 inch. To de-mold the edger 10, the stripper shoe having the three-dimensional pattern or texture presses against the front top face 12 which is facing upwardly and is opposed to the stripper shoe. The resulting edger 10 is cured, and after curing, the edger 10 is usable. FIGS. 7 and 8 show end views of the edger 10 of FIG. 6, in which the topographical definition 14 of the top face 12 shows its end profile views.

Figure 9:
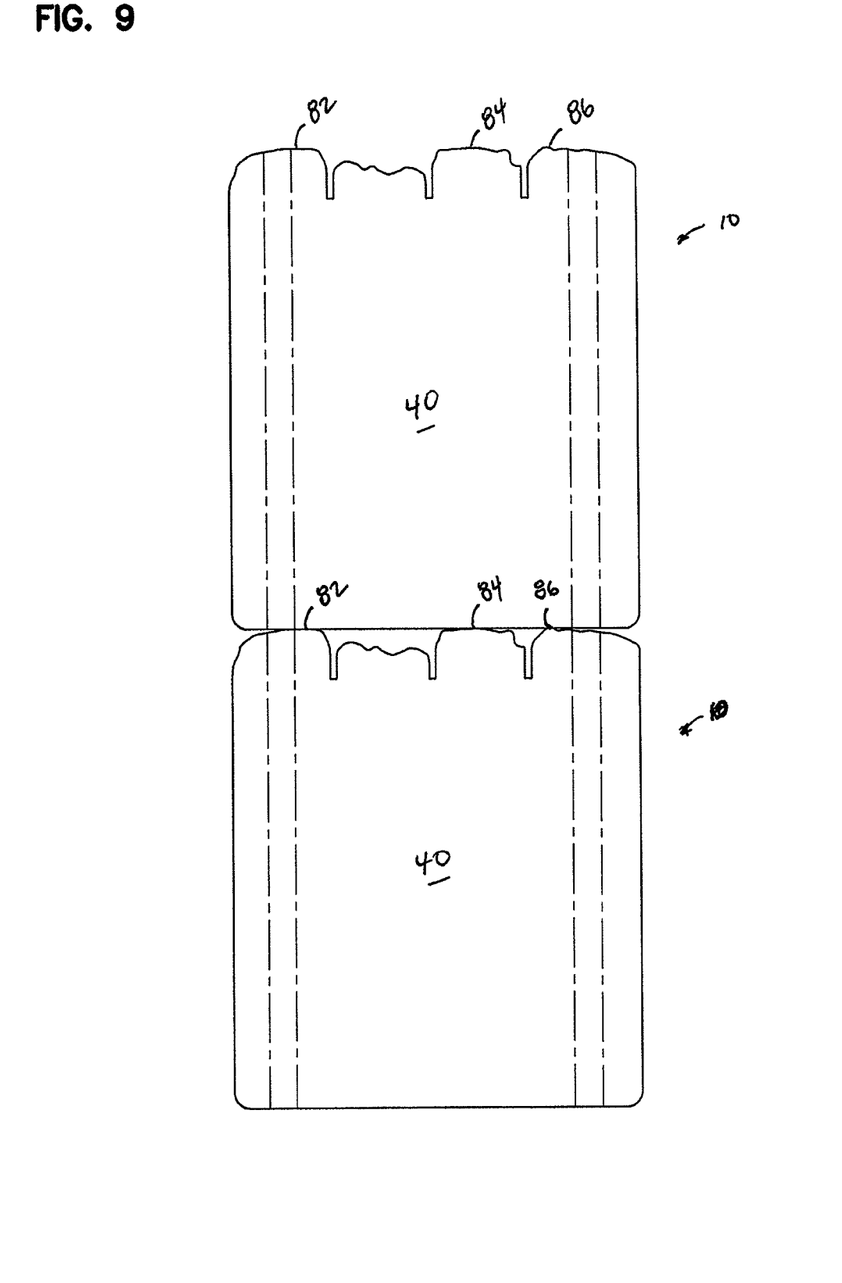
FIG. 9 is an end view of two of the edgers of FIG. 6 in a stacked arrangement.

In the embodiment of FIGS. 6-9, within the topographical definition 14 of the top face 12, projections will preferably include at least three stacking projections spaced along the length and across the width of the edger 10 to define three points on a plane and illustrated in FIGS. 6 and 9 at 82, 84, 86. The at least three stacking projections 82, 84, 86 are projections within the topographical definition 14 away from the top face 12 that are of a greatest height of the top face 12 from the bottom face 18 of the edger 10. Each of the at least three stacking projections 82, 84, 86 have substantially the same height from the bottom face 18 of the edger 10. This allows for the edgers 10 to be stacked on top of each other, with bottom faces 18 stacked on top of top faces 12 to allow for transportation and storage of the edgers 10 (see FIG. 9). Depending on the style of the top face 12 and the pattern of the top face 12, the number and locations of the stacking projections 82, 84, 86 can vary.

The edgers 10 can be made from dry cast concrete, according to processes described in commonly assigned U.S. Pat. Nos. 7,140,867 and 7,208,112, each incorporated by reference in their entirety herein.

Example Methods of Use

Figure 4:
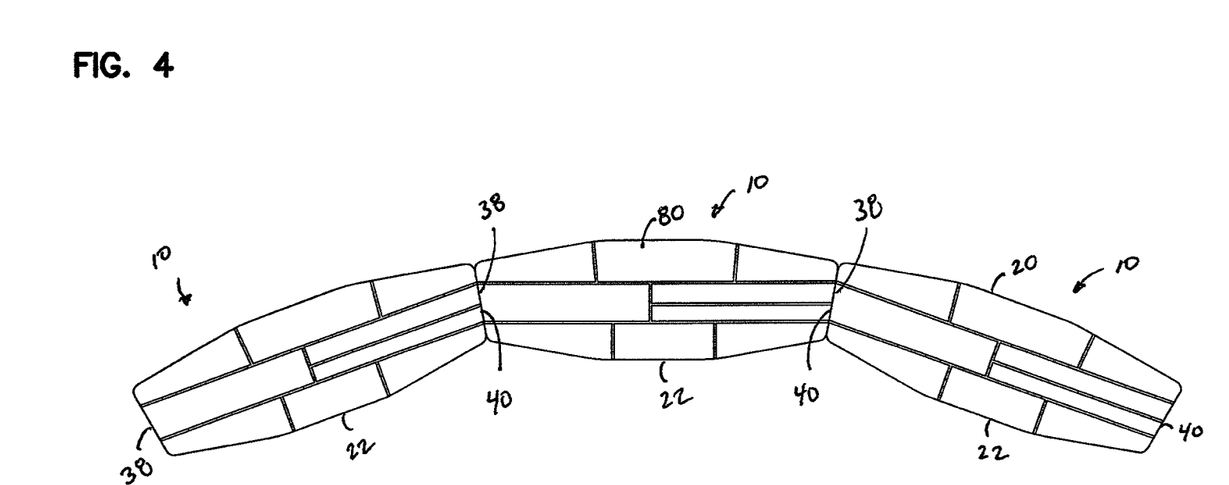
FIG. 4 is a top view of a second embodiment of landscaping edgers made in accordance with principles of this disclosure and arranged in a curved path.
Figure 5:
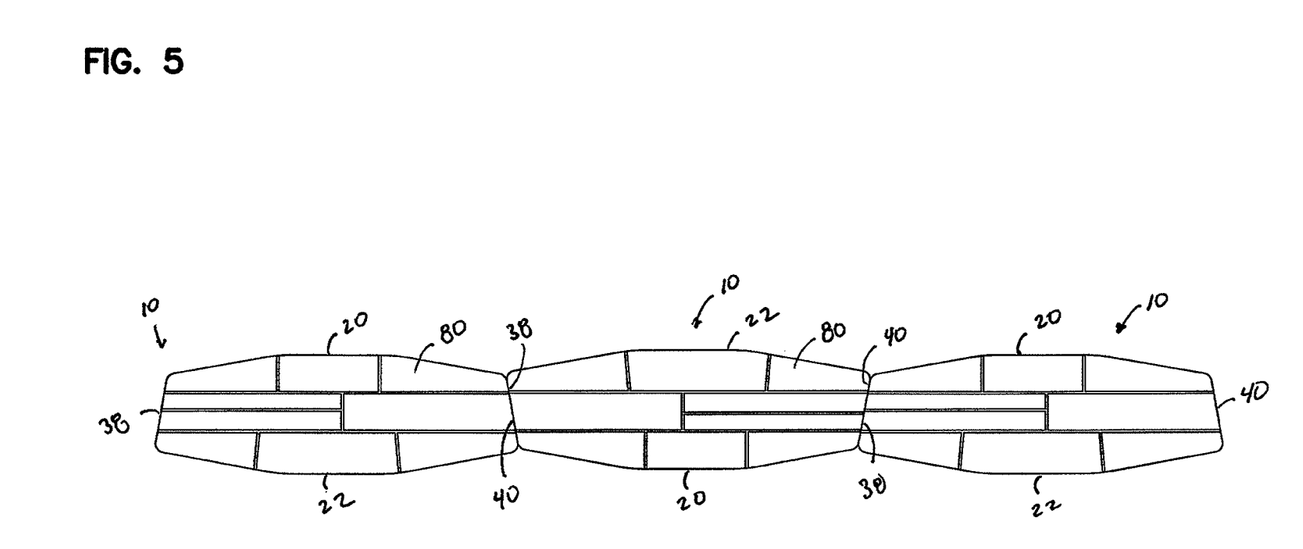
FIG. 5 is a top view of the landscaping edgers of FIG. 4 but arranged in a straight or linear path.

FIGS. 4 and 5 illustrate two examples of how landscaping edgers 10 made in accordance with principles of this disclosure can be used. The edgers 10 shown in FIGS. 4 and 5 are the same as the edger 10 shown in FIG. 6. As mentioned previously, in these edgers 10, the topographical definition 14 has the appearance of a ledge wall face 16.

FIG. 4 shows a plurality, in this case 3, edgers 10 arranged end to end with respective end faces 38, 40 against each other and with the respective front faces 20 of each arranged adjacent to each other. Similarly, the respective rear faces 22 are arranged adjacent to each other. In this arrangement, the top face 12 of each edger 10 is oriented in an upward direction, and bottom face 18 is oriented at the lowest position and against a base surface, such as the ground or a sand base. As can be seen in FIG. 4, the edgers 10 form a curved or non-linear path. This path could be continued to form an entire closed circle.

In the embodiment of FIG. 5, again, the edgers 10 are oriented with the top face 12 up and the bottom face 18 down and against a base surface, such as the ground. In this case, however, the front face 20 of one edger 10 is positioned adjacent to the rear face 22 of the next adjacent edger 10. The end faces 38, 40 of each edger 10 are flat against the respective end face 38, 40 of the adjacent edger 10. As can be seen in FIG. 5, this arrangement forms a straight, linear path.

Example Dimensions

One preferred example edger 10 is described below. This is an example only, and of course, variations can be made. An overall length between corner 46 and corner 50 will be about 10.5 inches, while an overall length between corner 48 and corner 44 will be about 9.8 inches. A length of the tapered portion 26 and tapered portion 27 of the front face 20 will be about 3.5 inches, and a length of the center portion 24 will be about 3.5 inches.

A length of the tapered portion 32 and tapered portion 33 will be about 3.3 inches, while a length of the center portion 30 will be about 3.2 inches.

A width w across the top face 12 between center portion 24 and center portion 30 will be about 3.5 inches. The intersection between each of the tapered portions 26, 27 and center portion 24 will be radiussed along a curve of about 4 inches. Similarly, the intersection between the tapered portions 32, 33 and center portion 30 will be along a radius of about 4 inches.

The angle between the first end face 38 and tapered portion 26 is about 90 degrees. The angle between the tapered portion 27 and second end face 40 is about 90 degrees. The angle between the first end face 38 and tapered portion 32 is about 110 degrees. The angle between second end face 40 and tapered portion 33 is about 110 degrees.

The intersection of the first end face 38 with the front face 20 and rear face 22 is on a radius of 0.220 inch, and the intersection of the second end face 40 with the front face 20 and rear face 22 is on a radius of 0.220 inch.

The weight of the edger 10 is no greater than 8 lbs.

The above represents examples and principles of this disclosure. Many embodiments can be made utilizing these principles.

We claim:

1. A landscaping edger comprising:
   (a) a top face, opposite bottom face, front face, and opposite rear face; first and second opposite end faces extending between the top and bottom faces, and the front and rear faces;
   (b) the entire first and the entire second end faces being angled inwardly toward each other from the front face to the rear face;
      (i) the intersection of the first end face with the front and rear faces being radiussed; and
      (ii) the intersection of the second end face with the front and rear faces being radiussed;
   (c) the top face having a length extending from the first end face to the second end face; the top face having a width extending from the front face to the rear face; the length being at least twice the width;
   (d) the top face having a three dimensional topographical definition with a plurality of projections and a plurality of reliefs recessed from the projections; and
   (e) the entire top face being sloped inside the edges of the top face so that water will drain from the entire top face of the edger over the edges of the top face by gravity.

2. An edger according to claim 1 wherein the front face, rear face, and end faces are generally smooth and free of projections.

3. An edger according to claim 1 wherein:
   (a) the intersection of the first end face with the front and rear faces is on a radius of 0.220 inch; and
   (b) the intersection of the second end face with the front and rear faces is on a radius of 0.220 inch.

4. An edger according to claim 1 wherein the first and second end faces are angled inwardly from the front face to the rear face at an angle of 10°.

5. An edger according to claim 1 wherein the greatest height difference between the projections and reliefs is at least 0.50 inch.

6. An edger according to claim 1 wherein a ratio of the length to the width is in a range of 3 to 1.

7. An edger according to claim 1 wherein the weight of the edger is no greater than 8 lbs.

8. A method of landscaping including:
   (a) providing first and second edgers, each edger including,
      (i) a top face, opposite bottom face, front face, and opposite rear face; first and second opposite end faces extending between the top and bottom faces, and the front and rear faces;
      (ii) the entire first and the entire second end faces being angled inwardly toward each other from the front face to the rear face;
         (A) the intersection of the first end face with the front and rear faces being radiussed; and
         (B) the intersection of the second end face with the front and rear faces being radiussed;
      (iii) the top face having a length extending from the first end face to the second end face; the top face having a width extending from the front face to the rear face; the length being at least twice the width;
      (iv) the top face having a three dimensional topographical definition with a plurality of projections and a plurality of reliefs recessed from the projections; and
      (v) the entire top face being sloped inside the edges of the top face so that water will drain from the entire top face of the edger over the edges of the top face by gravity; and
   (b) arranging one of the first and second end faces of the first edger adjacent to one of the first and second end faces of the second edger.

9. A method according to claim 8 wherein the step of arranging includes arranging the first and second edgers to be along a non-linear path.

10. A method according to claim 9 wherein the step of arranging includes positioning each of the first and second edgers with the top face up and bottom face against a base surface, and positioning the front faces adjacent each other.

11. A method according to claim 8 wherein the step of arranging includes arranging the first and second edgers to be along a linear path.

12. A method according to claim 11 wherein the step of arranging includes positioning each of the first and second edgers with the top face up and bottom face against a base surface, and positioning the front face of the first edger adjacent to the rear face of the second edger.

* * * * *